No. 796,517. PATENTED AUG. 8, 1905.
F. JACKSON.
BATTERY HOLDER FOR AUTOMOBILES.
APPLICATION FILED SEPT. 27, 1904.
2 SHEETS—SHEET 1.
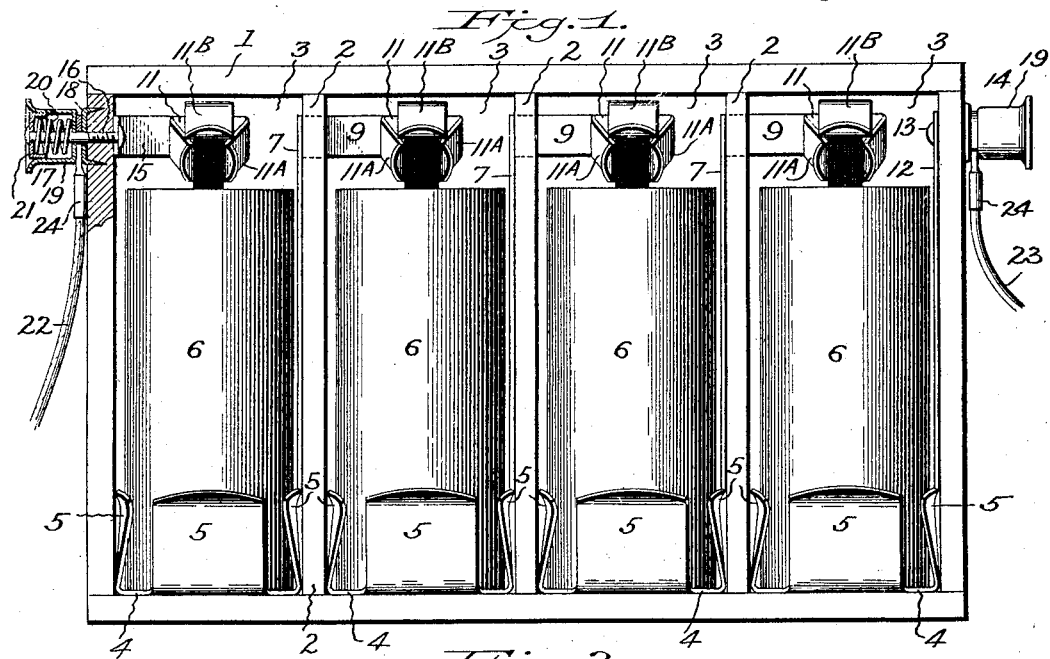
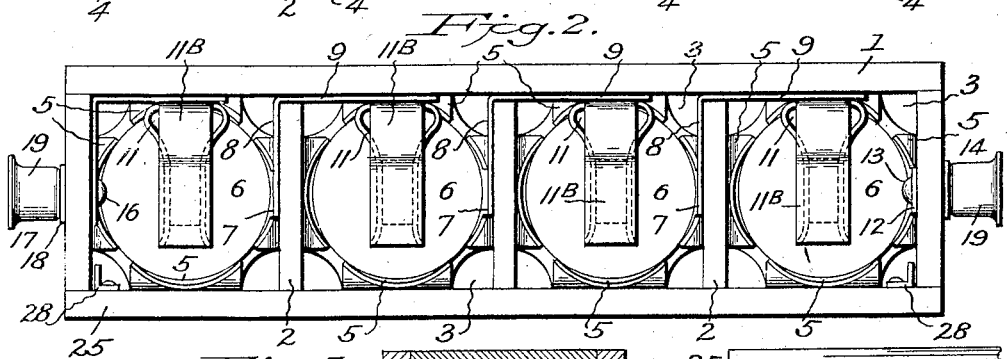
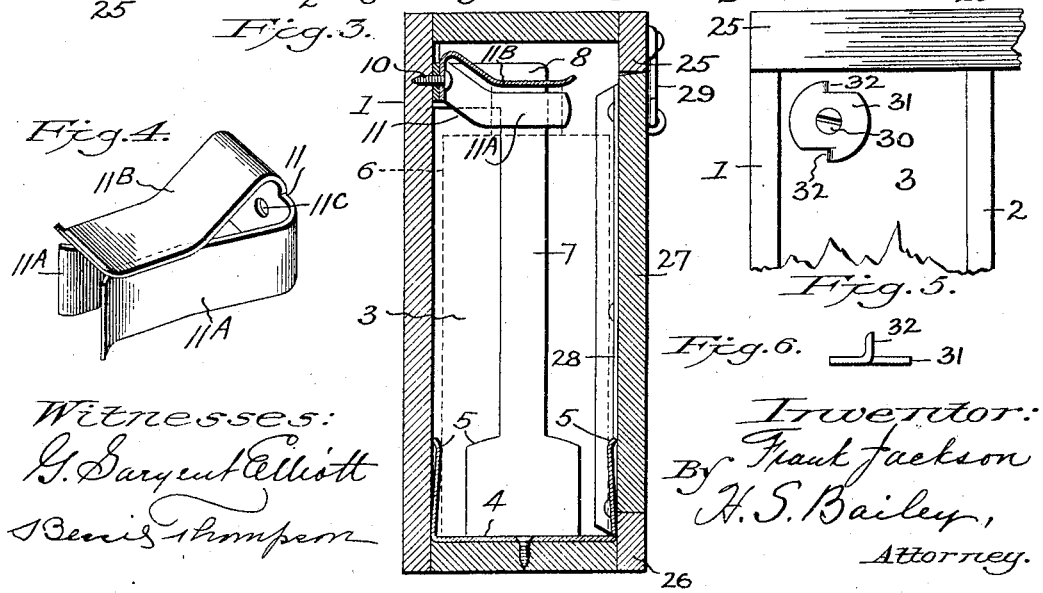
Witnesses:
G. Sargent Elliott
Benj. Thompson
Inventor:
Frank Jackson
By H. S. Bailey,
Attorney.

No. 796,517. PATENTED AUG. 8, 1905.
F. JACKSON.
BATTERY HOLDER FOR AUTOMOBILES.
APPLICATION FILED SEPT. 27, 1904.
2 SHEETS—SHEET 2.
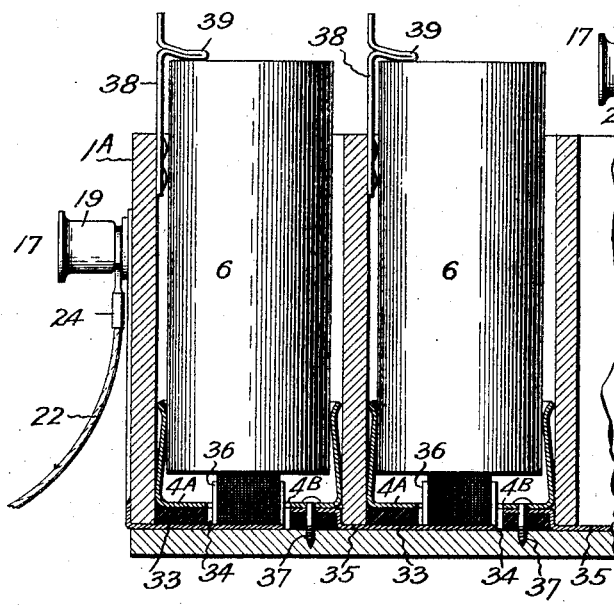
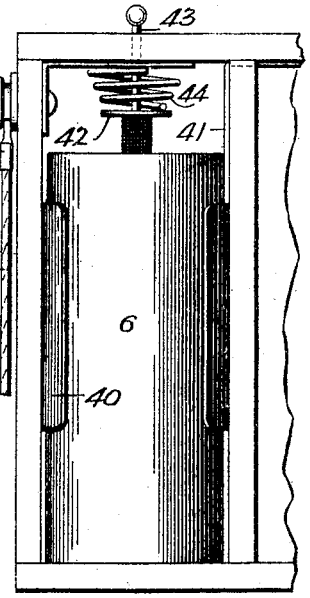
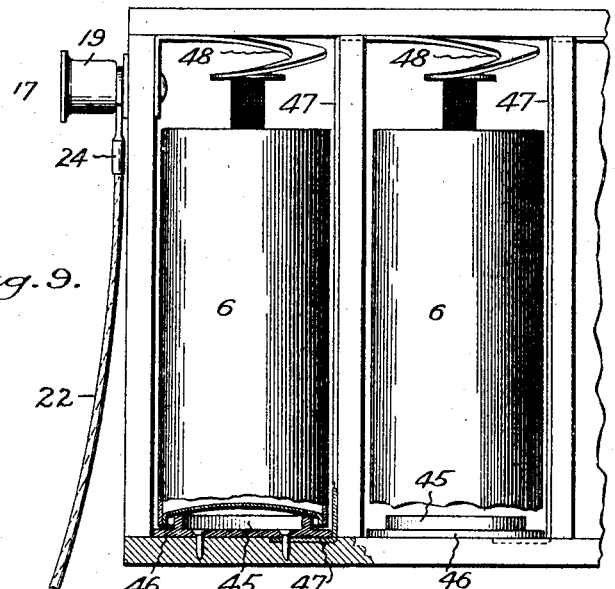
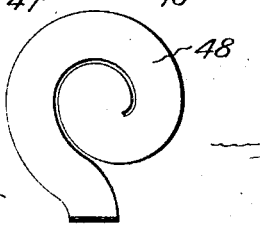

UNITED STATES PATENT OFFICE.

FRANK JACKSON, OF DENVER, COLORADO, ASSIGNOR TO THE JACKSON MANUFACTURING COMPANY, OF DENVER, COLORADO, A COMPANY ORGANIZED UNDER THE LAWS OF COLORADO.

BATTERY-HOLDER FOR AUTOMOBILES.

No. 796,517.     Specification of Letters Patent.     Patented Aug. 8, 1905.

Application filed September 27, 1904. Serial No. 226,143.

*To all whom it may concern:*

Be it known that I, FRANK JACKSON, a citizen of the United States of America, residing in the city and county of Denver and State of Colorado, have invented certain new and useful Improvements in Battery-Holders for Automobiles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in spark-generating battery-holders and attachments therefor used in connection with gasolene or other vapor-operated automobiles.

The object of my invention is to provide a battery-holder in which the batteries can be instantaneously connected in the spark-producing circuit without the necessity of wiring said batteries to each other, thus enabling a person to withdraw a battery from the holder and replace the same without the time and bother consequent upon connecting and disconnecting wires, the batteries being maintained in positive connection with each other and with the holder and the said holder being connected by circuit-wires with the cylinder of the engine in the usual manner, the current through the batteries and cylinder being utilized to intermittently produce a spark in the cylinder by the well-known circuit making and breaking mechanism.

Another object of the invention is to provide an improved means for connecting the circuit-wires to the battery-holder in order that they may be quickly attached and detached; and the invention further consists in means for securely holding the several batteries in the holder or casing, so as to prevent their rattling or shaking while the vehicle is in motion.

These objects are attained by the mechanism illustrated in the accompanying drawings, in which—

Figure 1 is a front elevation of the preferred form of my improved battery-holder, the cover or door being removed to show the batteries in operative position. Fig. 2 is a plan view of the battery-holder and batteries, the top of the holder being removed. Fig. 3 is a transverse vertical sectional view taken centrally through one of the compartments of the holder, the battery being shown in dotted lines. Fig. 4 is a perspective view of one of the spring-catches which are secured at the upper end of each compartment of the holder in position to receive the carbons of the batteries. Fig. 5 is a fragmentary view of the upper end of one of the end compartments of the holder, showing a washer secured to the rear side thereof, through which a retaining-screw is passed. Fig. 6 is an edge view of the washer shown in Fig. 5. Fig. 7 in a sectional view of a portion of a holder, illustrating a modification in which the batteries are held in an inverted position. Fig. 8 is a front view of a compartment of a battery-holder, illustrating another manner of retaining the battery in operative position, a spring-pressed plunger being employed which bears upon the carbon, while a metal jacket partially surrounds the carbon. Fig. 9 is a front elevation of a portion of a holder, illustrating still another modification in which the battery rests upon a metal plate and is held down by a spiral plate-spring which bears upon the carbon. Fig. 10 is a plan view of the form of holder shown in Fig. 7, and Fig. 11 is a plan view of the plate-spring shown in Fig. 9.

Gasolene or other vapor-operated automobiles employ a sparking device for igniting the vapor at each alternate stroke of the engine-piston. The device in common use consists of a plurality of dry batteries inclosed in a suitable box or holder connected in a circuit with the piston-chamber of the engine, the battery box or holder being suitably secured to any part of the automobile convenient of access to the attendant. The batteries as at present employed are connected by wires in the ordinary manner, and to disconnect a spent battery and replace it with a fresh one requires a considerable expenditure of time and trouble, and the rattling of the batteries, due to the motion of the vehicle, occasions no little annoyance. My present device is designed to completely overcome these objections.

In the accompanying drawings, the numeral 1 refers to a suitable box or casing which I term the "battery-holder" and which is divided by partitions 2 into compartments 3. In Figs. 1 and 2 I have shown a holder having four compartments in a row; but any number of compartments may be employed, and they may be arranged in a double row, if desired. At the bottom of each compartment 3 is suitably secured a metal socket 4, comprising a plate having a plurality of integral upturned resilient members 5, which substantially inclose the lower end of an ordinary dry battery 6. The members 5 of the sockets are curved at their upper ends to conform to the contour of the batteries, and they incline slightly toward the centers of the sockets, so that they must be sprung outward when a battery is inserted, the resiliency of the members causing them to tightly clamp the lower portions of the batteries. Beginning with the first compartment toward the left the upturned members 5 of the socket, adjoining the next compartment, is formed with an upwardly-extending conductor-arm 7, which reaches nearly to the top of the compartment. It is then formed with a right-angled portion 8, which extends rearward to the back of the compartment, where it is bent to form an extension 9, which passes through a slit in the partition and extends over into the adjoining compartment, where it is secured to the rear side of the holder by a screw 10, which also secures a spring-clamp 11, as clearly shown in Fig. 3. Thus the socket of one compartment by its conductor-arm is connected with the spring-clamp of the next compartment to the right, and so on in this manner until the last compartment is reached, when the upwardly-extending arm 12 of the last socket is connected by a screw 13 with an improved form of binding-post 14, which will be more fully hereinafter described. The spring-clamp 11 of the first compartment connects with a conductor 15, which is secured to the end of the holder by a screw 16, which also secures a binding-post 17, similar to the post 14 at the opposite end of the holder. The spring-clamps are preferably stamped from suitable sheet metal, and the blank thus formed is then bent to form side jaws 11$^A$, which are parallel and a suitable distance apart, and a spring plate or tongue 11$^B$, which extends over and slightly above the jaws. The closed ends of the clamps are provided with holes 11$^C$, through which the retaining-screws 10 pass. By reference to Fig. 1 it will be seen that the batteries are placed in the sockets 4 and the carbons are passed between the jaws 11$^A$ of the clamp 11, which securely hold them against lateral movement, while the spring plate or tongue 11$^B$ will press upon the top of the carbons and prevent the upward movement of the batteries caused by the jolting of the automobile. The ends of the plate and side jaws of the spring-clamp are outwardly bent, as shown, to enable the carbon to be more easily and quickly inserted, and the said tongue and jaws exert a sufficient tension to securely hold the battery against movement in any direction.

The improved binding-post, which is shown in section upon the left end of the holder, is constructed in the following manner: A screw 16 passes through a conductor and through the end of the holder and also through a metal plate or washer 18, which is suitably secured upon the outside of the end of the holder, preferably by forming prongs upon its edge, which are driven into the end of the holder. A thimble 19, one end of which is closed and is provided with a central aperture, is then slid upon the projecting end of the screw, its closed end abutting against the plate 18. A coiled spring 20 is next placed over the screw within the thimble 19, and a cupped plate 21 is secured upon the end of the screw, preferably by riveting, the said plate being positioned just inside the outer end of the thimble, which is flared, as shown, to form a rim which can be conveniently grasped by the finger or thumb of an attendant. The spring 20 is compressed between the plate 21 and the end of the thimble, and the expansive tension caused thereby holds the thimble firmly against the washer 18 upon the end of the holder. The binding-post 17 is connected by a circuit-wire 22 with the piston-chamber of the engine, and the binding-post 14 at the opposite end of the holder is also connected with the said piston-chamber by a circuit-wire 23. The ends of these wires 22 and 23, which are attached to the binding-posts, are each provided with a suitable metallic hook 24, and to attach the wire to the binding-post it is only necessary to pull the thimble 19 out a slight distance and place the hook 24 upon the screw of the binding-post, and upon releasing the thimble the spring 20 will force it against the hook 24, which will then be securely clamped between the thimble and the washer 18 on the end of the holder. When wires 22 and 23 are attached to their respective binding-posts, a circuit extending through the batteries and piston-chamber is established, the current from the first battery passing from its zinc casing to the socket 4 and thence through conductor-arm 7 and spring-clamp 11 to the carbon of the second battery and thence in this order through the several batteries to the binding-post 14 and circuit-wire 23, through wire 23 to sparking mechanism, and thence to piston-chamber, returning through wire 22 to binding-post 17, and through conductor 15 and spring-clamp 11 to carbon of first battery. This manner of connecting the batteries with each other is simple and positive, doing away with the present troublesome wiring system and providing for instantaneously connecting and disconnecting the batteries in a circuit, while the spring-clamps and sockets securely hold the batteries and prevent rattling and at the same time afford ample contact area for the passage of the current.

The front side of the battery-holder is closed in the following manner: At the top edge of the holder and extending from end to end thereof is secured a strip of wood 25 of a width that will not interfere with the removal and replacing of the batteries, and upon the bottom edge of the holder is secured a strip 26, similar to the strip 25. A door 27 fits between these two strips, and this door is provided on its inner side near its ends with metal strips or cleats 28, which extend a slight distance below the lower edge of the door. These cleats are preferably in the form of angle-bars and, as shown in Fig. 2, practically abut against the inner side of the ends of the holder, and thus prevent endwise movement of the door. The ends of the cleats which extend below the lower edge of the door engage the inner side of the strip 26, and thus secure the lower edge of the door, while the upper edge is secured by a hook 29 or by any other suitable fastening device, and by this construction the door is easily and quickly removed and replaced. The retaining-screws 30, by which the holder is secured to the automobile, pass through washers 31, which are provided with integral prongs 32, that are driven into the rear side of the holder, as shown in Fig. 5, and these washers prevent the screw-holes in the holder from wearing, owing to the constant jolting of the automobile while in motion, and the holder is thus prevented from shaking or rattling upon its retaining-screws.

In Fig. 7 I illustrate a different manner of connecting the batteries. The holder $1^A$ is open at the top and is of less depth than the height of the battery, and in the bottom of each compartment is placed an insulating-plate 33, preferably fiber, having a central aperture 34 of suitable diameter. Upon the plate 33 a socket $4^A$ is secured, said socket being similar to the sockets 4 (shown in Figs. 1, 2, and 3 with the omission of the conductor-arm) and being provided with a central aperture $4^B$, similar to the one in the plate 33. Beneath the insulating-plate is a metal strip 35, having at one end a pair of vertically-disposed spring clamping-jaws 36, which extend up through the apertures in the fiber plate 33 and socket $4^A$, while the opposite end of this strip extends into the adjoining compartment and is secured to the socket $4^A$ therein preferably by passing between the socket and fiber plate, so that a single screw 37 will secure the socket, fiber plate, and strip to the bottom of the holder. With this arrangement of holder the battery is inverted and placed in the holder from the top, so that the carbon point will be held by the clamping-jaws 36, while the lower end of the battery will be clamped by the socket $4^A$. The batteries are held down by spring-catches 38, secured to the holder, having lateral projections 39, which rest upon the top of the batteries. The current passes in through the carbon of the first battery and out through the zinc of the last battery, the clamping-jaws in any one compartment being insulated from the socket in the same compartment, as shown.

In the modification shown in Fig. 8 the socket is dispensed with and a spring-metal jacket 40 partially surrounds the battery, the said jacket having an integral conductor-arm 41, which extends into the adjoining compartment and connects with the carbon of the battery in that compartment, the means of connection being a plunger comprising a disk 42, which rests upon the top of the carbon, having a stem 43, which extends through the conductor 41 and through the top of the holder, and a helical spring 44, which is interposed between the conductor and the disk 42 of the plunger and holds the said battery against upward movement.

In the modification illustrated in Fig. 9 the battery rests upon the integral ring portion 45 of a metal disk 46, which is secured to the bottom of the compartment, and one end of a conductor 47 is secured to this disk. This conductor extends up and over into the adjoining compartment, and its other end is formed into a spiral spring-plate 48, which rests upon the carbon of the battery in that compartment and holds it against upward movement.

The device herein illustrated and described is simple and thoroughly practical, and while specially adapted for use in gasolene or other vapor-operated automobiles it is applicable in any case where a series of batteries is employed.

Having described my invention, what I claim as new, and desire to secure by Letters Patent, is—

1. In a battery-holder, a box comprising a plurality of compartments; a metal socket secured at the bottom of each compartment; a conductor extending from the socket of one compartment, into the upper end of the adjoining compartment and a spring-clamp connected with the end of said conductor substantially as described.

2. In a battery-holder, a box comprising a plurality of compartments; a socket comprising a base-plate and integral resilient side members, secured at the bottom of each compartment; a conductor extending from the socket of one compartment into the upper end of the adjoining compartment; and a spring-clamp connected with the end of said conductor, and to a wall of the compartment, substantially as described.

3. In a battery-holder, a box comprising a plurality of compartments; a resilient battery-support in the bottom of each compartment; a spring-clamp in the top of each compartment, and a conductor connecting the battery-support in one compartment, with the spring-clamp in the adjoining compartment; a binding-post connected with the first spring-clamp of the series, and a binding-post connected with the last battery-support of the series, substantially as shown.

4. The combination with a battery-holder, comprising a series of compartments, of a resilient metal socket at one end of each compartment; a spring-clamp at the other end of each compartment, and conductors which connect the socket in each compartment, with the spring-clamp in the adjoining compartment, substantially as shown.

5. The combination with a battery-holder comprising a plurality of compartments, of a resilient metal support in each end of each compartment, and a conductor in each compartment, which connects the support at one end of that compartment with the support at the opposite end of the adjoining compartment, substantially as described.

6. In a battery-holder, a box partitioned into a series of compartments, a resilient, metal socket in one end of each compartment, a metal clamp at the other end of each compartment; and conductors which connect the socket of each compartment with the metal clamp of the adjoining compartment; a binding-post at one end of the holder connected with the adjoining metal clamp; a binding-post at the opposite end of the holder, connected with the adjoining socket, strips which extend across the upper and lower edges of said holder from end to end; and a door which fits between said strips, having cleats upon its inner side which extend below the lower edge of the door and engage the inner face of the lower strip, and fastening means at its upper end, substantially as described.

In testimony whereof I affix my signature in presence of two witnesses.

FRANK JACKSON.

Witnesses:
G. SARGENT ELLIOTT,
BESSIE THOMPSON.